April 30, 1963  M. A. MEYER  3,088,109
SIGNAL PROCESSING APPARATUS
Filed Oct. 10, 1956  6 Sheets-Sheet 1

INVENTOR
MAURICE A. MEYER

BY Joseph Weingarten
ATTORNEY

April 30, 1963   M. A. MEYER   3,088,109
SIGNAL PROCESSING APPARATUS
Filed Oct. 10, 1956   6 Sheets-Sheet 2

INVENTOR
MAURICE A. MEYER
BY Joseph Weingarten
ATTORNEY

United States Patent Office 3,088,109
Patented Apr. 30, 1963

3,088,109
SIGNAL PROCESSING APPARATUS
Maurice A. Meyer, Natick, Mass., assignor to Laboratory for Electronics, Inc., Boston, Mass., a corporation of Delaware
Filed Oct. 10, 1956, Ser. No. 615,733
7 Claims. (Cl. 343—8)

The present invention relates in general to electrical signalling systems and in particular to apparatus for tracking and combining signals related to the spectral components of an input signal. When used in a Doppler radar navigational system, such as that disclosed in the copending application of Maurice A. Meyer, entitled Doppler Radar System, Serial No. 610,444, filed September 10, 1956, the novel system is capable of providing output signals in pulse form whose frequency is an accurate indication of velocity components of the aircraft along three orthogonal axes, one of which is the normally vertical axis of the aircraft. The apparatus is sufficiently sensitive to slight velocity changes to be utilized as a hovering indicator in a helicopter, yet still capable of responding to the relatively high Doppler frequency shifts associated with the supersonic velocities of jet aircraft and rocket powered missiles. It exhibits a high degree of reliability and may be instrumented in lightweight compact form.

This application is a continuation in part of the above-identified application and the co-pending application of Maurice A. Meyer, entitled Frequency and Phase Sensitive Apparatus, Serial No. 464,697, filed October 26, 1954.

While the apparatus of the present invention is of general utility wherever it is desired to derive a single frequency signal characteristic of one or more frequency spectra, it will be described herein in connection with its specific utility in a Doppler radar system.

As indicated in the aforesaid co-pending application entitled Doppler Radar System, that system utilizes coherent fixed frequency signals, offering advantages which are described in detail in the co-pending application of Maurice A. Meyer, entitled Signal Selection System, Serial No. 611,811, filed September 20, 1956. A typical prior art system is of the non-coherent type wherein depressed beams are oriented forward and rearward, with a pulsed magnetron generating microwave energy for radiation. The Doppler frequency shift is determined by mixing the signal returns from the forward and rearward beams to derive a signal with audio frequency Doppler shifted spectra disposed about frequencies separated by an integral multiple of the pulse repetition frequency. This signal is then applied to a low pass filter which rejects all the spectra except the one about the lowest audio frequency.

Several disadvantages are inherent in such a system. First, spectra containing useful information are discarded, thereby reducing system sensitivity. Second, the system is limited to sensing Doppler frequency shifts below an audio frequency equal to substantially one-half the pulse repetition frequency. The reason for this is discussed below in connection with the description of the phenomenon known in the art as spectrum foldover. Since the Doppler frequency shift is proportional to velocity, the limitation imposed as a result of spectrum foldover restricts the highest velocity to which prior art apparatus is sensitive to such an extent that operation at the high velocities now attained by jet aircraft and rocket powered missiles is difficult to realize.

Accordingly, it is an object of the present invention to provide for use in a Doppler radar system spectrum tracking apparatus having high noise rejection properties which is capable of responding to a plurality of the returned Doppler frequency-shifted spectra, thereby enhancing overall system sensitivity, and is responsive to such a wide range of frequencies that its output signal may be utilized to indicate zero velocity to such accuracy that a helicopter may be hovered thereby, yet still is capable of providing an output signal accurately indicative of supersonic velocities.

Another object of the invention is the provision of apparatus which responds to an input signal frequency spectrum and provides a single frequency output signal characteristic of the energy distribution about a selected frequency within said spectrum.

Still a further object of the invention is the provision of apparatus which responds to an input signal having a plurality of frequency spectra and provides a single frequency output signal characteristic of the energy distribution about a selected frequency within the band encompassing said spectra.

It is an object of the invention to provide a plurality of single frequency signals according to the above objects, each characteristic of the Doppler frequency shift present in the energy return from respective radiated beams, said single frequency signals being at radio frequency to facilitate their nonlinear combination in mixers.

Still another object of the invention is the provision of means for combining the aforesaid radio frequency signals to derive low frequency signals, each of a frequency which is characteristic of a velocity component along a selected set of orthogonal axes referred to the aircraft. An advantage of tracking before combining in accordance with this object is a reduction in noise figure and corresponding increase in system sensitivity.

According to a broad aspect of the invention, there is provided a source of a signal having a band of spectral components, and means for sensing the power in a continuous band encompassing a plurality of the spectral components, and arranged to provide a single frequency output signal of a frequency which divides said continuous band into bands having relative energy content according to a predetermined ratio. In a representative form, the predetermined ratio is unity.

In a more specific form which the invention takes when used with a Doppler radar system, high frequency energy is radiated and means are provided for receiving the returned energy having Doppler frequency-shifted spectra. The received spectra are translated to a portion of the frequency spectrum convenient for tracking, although still at radio frequency and tracked in the manner indicated above to derive a single frequency output signal. In a system where there are a plurality of beams, a single frequency output signal is derived for each beam, the frequency characterizing the Doppler frequency shift of the energy returned from the respective beams. The single frequency signals are non-linearly combined in apparatus which may include mixers and doublers to derive a low frequency signal whose frequency is indicative of a generalized Doppler variable, defined below, and which in turn is related to velocity components of the vehicle transporting the Doppler radar system. In another aspect of the invention, the frequency spectra are non-linearly combined before tracking.

In a representative embodiment of the invention in an airborne Dopler radar system, means are provided for radiating three depressed pencil beams which are spaced by 90° in the azimuthal plane, respectively oriented forward, rearward and to the side. The returned energy from each beam is separately received and the respective Doppler frequency-shifted spectra translated by suitable means to a portion of the frequency spectrum about a tracking frequency. Responsive to the power distribution of the translated spectra, there is provided for each beam a single frequency output signal of a frequency which divides the frequency band encompassing the spectra whose power is sensed, into bands of substantially equal energy.

The single frequency signal related to the side beam is then doubled and applied to the signal input of a digital discriminator whose reference input is energized by a sum frequency signal derived by mixing the single frequency signals related to the forward and rearward beams. The digital discriminator provides a pulse train output of a frequency equal to the difference between the frequencies of signals on the signal and reference inputs together with an indication of the relative position in the frequency spectrum of signals on the signal and reference inputs.

The sum frequency signal is also applied to the signal input of a second digital discriminator whose reference input is energized by a fixed frequency signal derived by doubling a signal of tracking frequency from a signal source of the system.

A third digital discriminator is energized respectively on its signal and reference inputs by the single frequency signals respectively related to the forward and rearward beams. The output signal from each digital discriminator is related to one of the generalized Doppler variables.

Another aspect of the invention is the provision of means for narrow band tracking when the single frequency signal is within a predetermined region of the returned carrier spectrum.

Other features, objects and advantages of the present invention will become apparent from the following specification when read in connection with the accompanying drawing in which.

Figure 1:
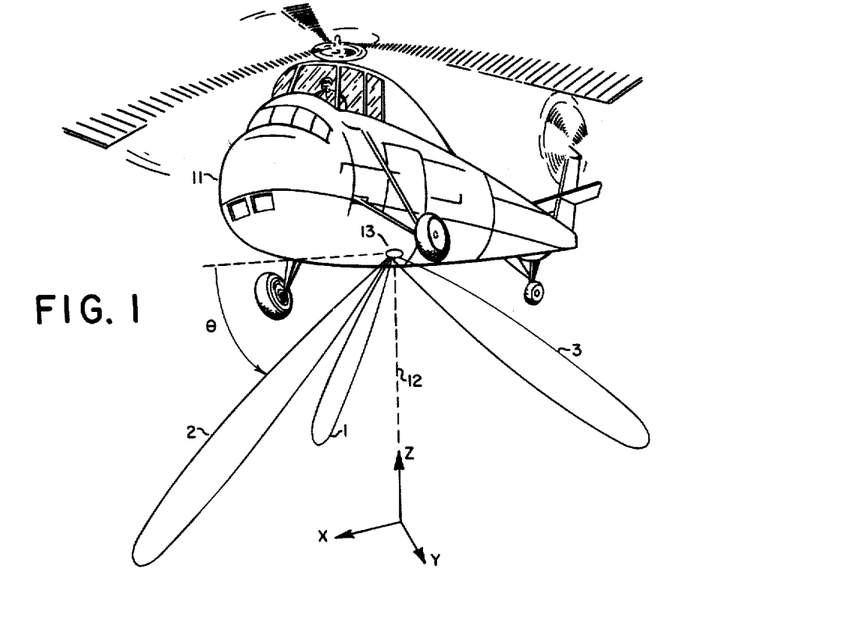
FIG. 1 illustrates a helicopter which utilizes a Doppler radar system employing three radiated pencil beams of microwave energy.

With reference now to the drawing and more particularly FIG. 1 thereof, a helicopter 11 is illustrated in level flight with apparatus aboard radiating a pencil beam 1 to the side, a second pencil beam 2 forward, and a third pencil beam 3, to the rear through microwave lens 13. All three beams are illustrated depressed whereby the angle between the beams and the horizontal plane of the aircraft is $\theta$. The direction of heading which the helicopter desires to fly is designated the X axis, the normally vertical axis 12 is designated the Z axis, and orthogonal to the X and Z axes is the Y axis; that is, motion along the latter axis represents sidewise movement of the helicopter relative to the desired heading.

Not only are the radiated beams focused by the microwave lens 13 disposed on the underside of the helicopter 11, but the lens also serves to focus energy returned from the respective beams upon respective horns from which the radiated energy emanated. By combining the Doppler frequency shift information from the three beams, the known orientation of the beams relative to the helicopter, and the roll and pitch of the helicopter, velocity components along the X, Y and Z axes may be determined. Application to a computer of signals characteristic of the velocities thus determined in conjunction with a heading information signal derived from apparatus such as a gyro compass, enables an accurate determination to be made of the aircraft position relative to a fixed point. This position indication may be manifested in terms of latitude and longitude or in distance along and deviations right and left of a selected course line. Suitable means may also be provided for indicating the direction and magnitude of velocity. The latter information is especially useful to the pilot when endeavoring to hover and control the helicopter.

The velocities sought to be determined are preferably referred to the fixed geographical axes of the earth. However, the beams are preferably fixed relative to the aircraft, for otherwise costly, heavy, power-consuming apparatus would be required to maintain the beam angular orientation unchanged relative to the X, Y, Z axes in space. Hence, a determination of the helicopter pitch and roll is desirable for accurate instantaneous computation of the aircraft velocity relative to the earth. The aspects of this computation are fully discussed in the above-mentioned copending application entitled Doppler Radar System, in addition to a derivation of the relation of generalized Doppler frequencies to the actual Doppler frequency shift associated with each beam.

Figure 2:
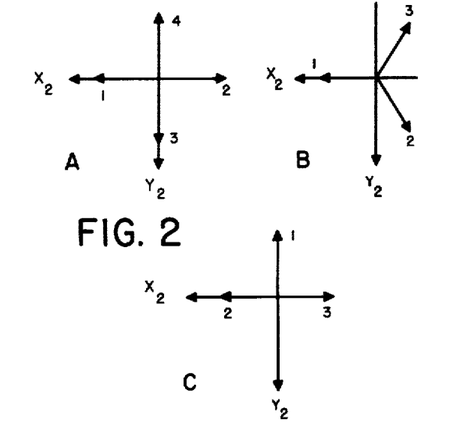
FIG. 2 is a representation of beam orientation in the horizontal plane for various beam configurations.

For respective beam configurations in the horizontal plane represented in FIG. 2, the last-mentioned relation is tabulated in FIG. 3A, FIG. 2A representing a four beam configuration with the beams spaced by 90°, one pair aligned along the longitudinal axis of the aircraft, and the other pair orthogonal thereto. FIG. 2B represents a three beam configuration with the beams spaced 120° apart, the projection in the horizontal plane of one beam directed forward along the longitudinal axis of the aircraft. FIG. 2C represents the preferred beam arrangement of the present system wherein a side beam is displaced 90° from a pair of beams whose horizontal plane projections are respectively directed forward and rearward along the longitudinal axis of the aircraft.

With reference to FIG. 3B, a table of equations relating the generalized Doppler variables to the three translational velocities is tabulated. The derivation of these equations appears in the co-pending application entitled Doppler Radar System.

Figure 3:
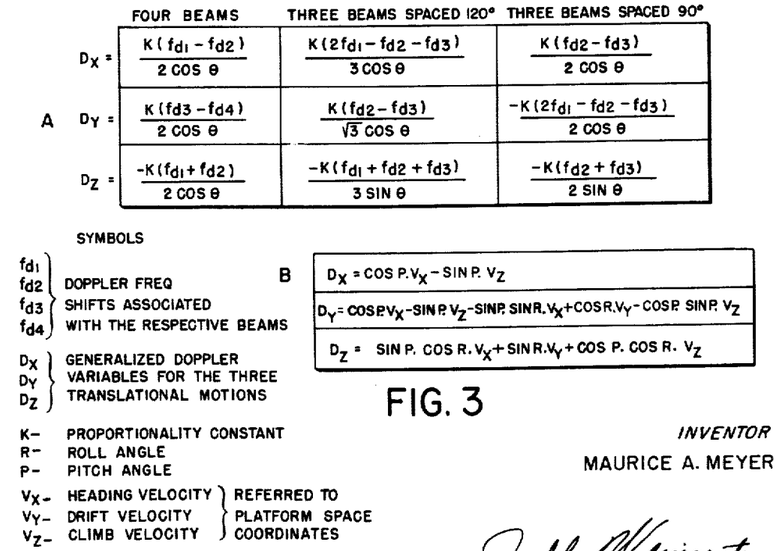
FIG. 3A is a table of equations which relates the generalized Doppler variables, characteristic of the three translational velocity components, to the Doppler frequency shifts sensed in the return from each radiated beam for the various beam configurations of FIG. 2.
FIG. 3B is a table of equations which relates the generalized Doppler variables to translational velocity components, taking into account the roll and pitch of the aircraft.

Before describing a system which instruments the equations of FIG. 3, the advantages of the present invention will be better understood from a consideration of the phenomenon of spectrum foldover encountered in prior art systems which track a Doppler frequency-shifted spectrum at audio frequencies. The phenomenon occurs when a frequency spectrum about a high frequency is translated about zero frequency. The lower sidebands of the original spectrum fold over the relocated upper sidebands when translated about zero frequency. It is especially objectionable in such systems when the Doppler frequency shift exceeds one-half the pulse repetition frequency of the radiated energy.

The difficulty will be understood when it is recognized that a line spectrum is radiated with spectral components including the carrier frequency and frequencies separated therefrom by integral multiples of the pulse repetition frequency. Each reflected spectral component is received as a Doppler frequency-shifted spectrum bearing substantially the same Doppler shift. When this shift exceeds one-half the pulse repetition frequency, the shifted spectrum returned from the carrier frequency is centered about a spectral line shifted from the latter by a frequency greater than half the pulse repetition frequency, while the reflected spectrum from the first lower sideband component is centered about a line less than one-half the pulse repetition frequency from the carrier frequency. When the latter spectrum is folded over, it appears between zero frequency and the desired return spectrum from the carrier component. The low pass filters of prior art apparatus would then cut off the desired spectrum and track the folded over spectrum, thus yielding an erroneous indication of the velocity, for increases in velocity would move the folded over spectrum closer to zero frequency while the desired spectrum moved further away.

Figure 4:
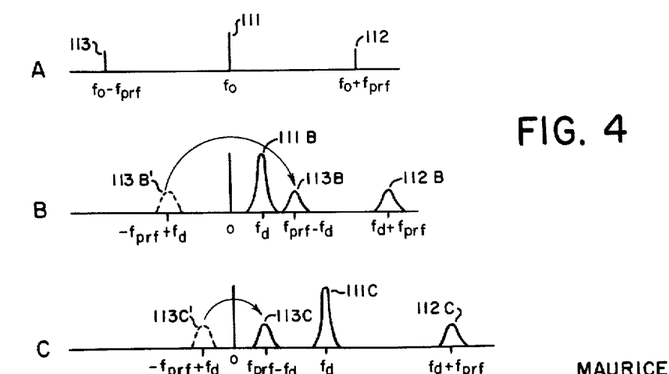
FIG. 4 is a graphical representation of spectral components of a pulsed radiated signal and Doppler frequency-shifted spectra present in the return signals characteristic of different velocities, helpful in understanding the phenomenon of spectrum foldover.

The example illustrated in FIG. 4 will clarify this phenomenon. In FIG. 4A, there is illustrated that portion of a radiated spectrum which includes the spectral components at carrier and first upper and lower sideband frequencies, respectively 111, 112 and 113, $f_0$ representing the transmitted microwave frequency, and $f_{prf}$, the pulse repetition frequency. FIG. 4B illustrates the returned Doppler shifted spectra from the corresponding spectral lines of FIG. 4A when the Doppler frequency shift $f_d$ is less than $$\frac{f_{prf}}{2}$$

and the returned spectra are translated about zero frequency. FIG. 4C is like FIG. 4B except $f_d$ is greater than $$\frac{f_{prf}}{2}$$

In FIG. 4B, spectra 111B and 112B are the returned Doppler spectra from transmitted spectral lines 111 and 112 respectively relative to zero frequency after translation thereabout. If negative frequencies were physically attainable, the position of the reflected spectrum from line 113 would be as indicated by image spectrum 113B' at $-f_{prf}+f_d$. Since negative frequencies are not physically attainable, the latter spectrum is folded over the zero frequency axis as indicated to become spectrum 113B, the same distance from the zero axis as image spectrum 113B'.

In one prior tracking arrangement, the spectrum tracked is the one nearest zero frequency. In the case illustrated in FIG. 4B, spectrum 111B, the return spectrum from the carrier occupies this position and is properly tracked to yield the correct velocity indication.

Now consider the case illustrated in FIG. 4C where $f_d$ exceeds $$\frac{f_{prf}}{2}$$

Spectra 111C, 112C and 113C are the returned Doppler spectra from transmitted line spectra 111, 112 and 113 respectively after translation about zero frequency. Again the image spectrum 113C' of spectrum 113C lies the same distance from the zero axis as the latter. However, now spectrum 113C lies nearest the zero axis and is accordingly tracked to yield an erroneous velocity indication.

This error is understood when it is realized that for increased velocities, the Doppler shift increases and spectra 111C and 112C and image spectrum 113C' move to the right. But spectrum 113C moves to the left, and tracking the latter yields an erroneous indication of decreasing velocity.

The above limitation introduces a severe obstacle toward adapting prior art apparatus for use in jet aircraft where the high velocities encountered result in corresponding Doppler frequency shifts which exceed one-half the pulse repetition frequency. Since the apparatus of the present invention is capable of tracking at a relatively high frequency and responding to a plurality of the returned spectra, no such limitation is imposed. While high frequency tracking is preferable for these reasons, the apparatus is also capable of tracking at low frequencies.

Figure 5:
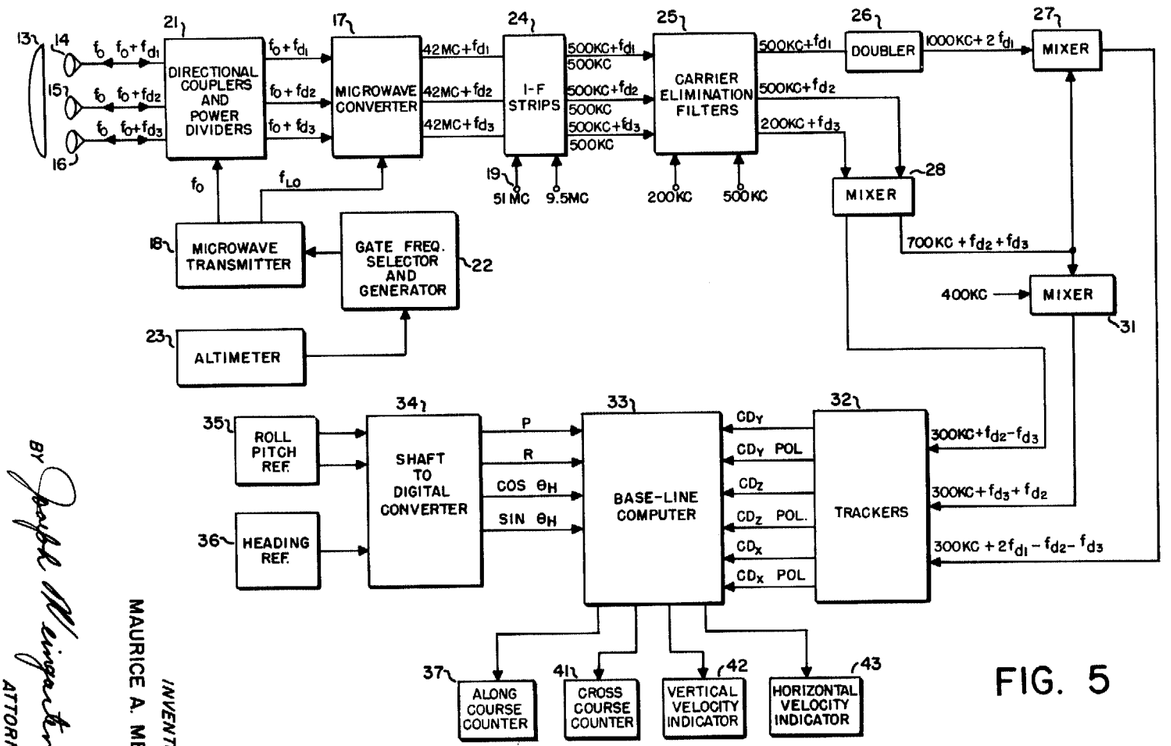
FIG. 5 is a block diagram of a Doppler radar navigational system.

With reference to FIG. 5 there is illustrated a block diagram of a Doppler radar system in which a plurality of spectra are tracked at radio frequencies, thereby avoiding the disadvantages of prior art system enumerated above. The mode of operation of the tracking apparatus is described in detail below. A microwave lens 13 is energized by radiated energy from conical horns 14, 15 and 16, the latter horns being coupled to microwave converter 17 and microwave transmitter 18 by the directional couplers and power dividers 21. Transmitter 18 generates a transmitted signal of frequency $f_0$ and local oscillator signal of frequency $f_{LO}$ during alternate mutually exclusive intervals in response to gating pulses from gate generator 22, the frequency of this signal being controlled by altimeter 23. Converters 17, energized by the local oscillator signal, provide output signals for application to I.-F. strips 24 which are also energized by a pair of fixed frequency signals to provide an output signal to carrier elimination filters 25, displaced in the frequency spectrum from the input signal, but retaining the Doppler frequency shifts. The latter filters are also energized by fixed frequency signals that are utilized as carrier signals upon which the Doppler frequency shifted signals are modulated. One output from filters 25 is applied to a frequency doubler 26 whose output is applied to a mixer 27. The other two output signals from filters 25 are applied to mixer 28 to provide sum and difference frequency signals, the sum signal being applied to mixers 27 and 31 while the difference frequency signal is directly applied to one channel of the trackers 32. The other input to mixer 31 is a fixed frequency signal to effect an output from the latter mixer which includes the desired Doppler frequency shifted signals disposed about a carrier signal, enabling the trackers to respond to the Doppler frequency shifts. The mixer 31 output signal is applied as a second signal input to trackers 32. The third signal for application to the tracker is derived from the output of mixer 27.

The output of the trackers include signals whose frequency shifts are proportional to the three generalized Doppler variables $D_x$, $D_y$ and $D_z$ discussed in detail in the aforesaid parent application, together with a polarity indication for each variable to indicate the sense of the associated Doppler shift. The signals are applied to the base line computer 33 which also receives signals from shaft-to-digital converters 34, indicative of pitch angle, roll angle, and the sine and cosine of the aircraft azimuthal heading angle. The shaft-to-digital converters 34 couple to the computer in digital form, the analog information derived from roll and pitch reference 35 and heading reference 36. The output of base line computer 33 energizes an along course counter 37, which indicates the distance traveled along the course from the starting point or other reference point, a cross course counter 41 which indicates the magnitude and direction of deviation across the selected course line, and vertical and horizontal velocity indicators 42 and 43 respectively which indicate magnitude and direction of aircraft velocity in elevation and azimuth respectively.

Having discussed the system arrangement, its mode of operation will be described. When gate generator 22 renders microwave transmitter 18 operative for the generation of a microwave signal of frequency $f_0$, the latter signal is coupled through power dividers and directional couplers 21 to each conical horn 14, 15 and 16 which respectively radiate beams through lens 13 which are focused into pencil beams by the lens.

Energy returned from the three beams is focused by the lens upon the respective horns from which the energy emanated. The directional couplers 21 direct the returned energy, which includes the transmitted frequency $f_0$ plus the Doppler frequency shifts $f_{d_1}$, $f_{d_2}$, $f_{d_3}$ from the beams respectively associated with horns 14, 15 and 16 to microwave converter 17. In microwave converter 17, the three received signals are mixed with a local oscillator signal to provide the signals with the Doppler frequency shifts, transposed in frequency about a 42 mc. I.-F. frequency as indicated, for amplification by respective channels in I.-F. strips 24. Fixed frequency signals of 51 mc. and 9.5 mc. are also applied to the latter strips and the difference frequency signal is mixed with the 42 mc. signal to provide outputs which include the Doppler frequency shifts about 500 kc.

As indicated above, a pulsed system is normally arranged so that the receiver is off when the transmitter is on. Thus, the 500 kc. carrier signal is usually not present. The exception occurs at very low altitudes when the pulse repetition frequency is at its highest value. Since energy from transmitted pulses returns almost instantaneously, the receiver is deliberately rendered operational during a portion of the interval in which a pulse is transmitted. During this interval, 500 kc. carrier signal is present in the I.-F. strips output signal. However, the proximity of the aircraft to the ground results in a signal return of sufficient strength to overcome the effects of carrier leakage after selective filtering by carrier elimination filters 25.

The signals from I.-F. strips 24 are applied to the carrier elimination filters 25. Each filter is preferably of the type described in the co-pending application of M. A. Meyer, entitled Selective Circuit, Serial No. 329,803, filed January 6, 1953, now Patent No. 2,909,656, and as illustrated in FIG. 1 thereof with respect to filters having $f_{d_1}$ and $f_{d_2}$ in the outputs. However, since it is desired that the signal output having the $f_{d_3}$ Doppler component be relatively close to 200 kc., the single side band modulator 25 in FIG. 1 of the aforesaid application is energized by quadrature components of a 200 kc. fixed frequency signal instead of the reference signal quadrature components as indicated therein.

The signal component containing $f_{d_1}$ is applied to doubler 26 to provide an output signal having a frequency component of 1000 kc.$+2f_{d_1}$. The other two output signals from the carrier elimination filters, having components including $f_{d_2}$ and $f_{d_3}$ about 500 and 200 kc. respectively, are applied to mixer 28 to provide a difference frequency signal of 300 kc.$+f_{d_2}-f_{d_3}$ which is applied to one input of the trackers 32. The sum signal from mixer 28, having 700 kc.$+f_{d_2}+f_{d_3}$ is applied to mixer 27, and the difference frequency output therefrom, $$300 \text{ kc.}+2f_{d_1}-f_{d_2}-f_{d_3}$$

applied to another input of the trackers 32. The sum signal from mixer 28 is also applied to mixer 31, which has a second input energized by a 400 kc. fixed frequency signal. The difference frequency signal therefrom is applied as the remaining input signal to the trackers 32.

Figure 6:
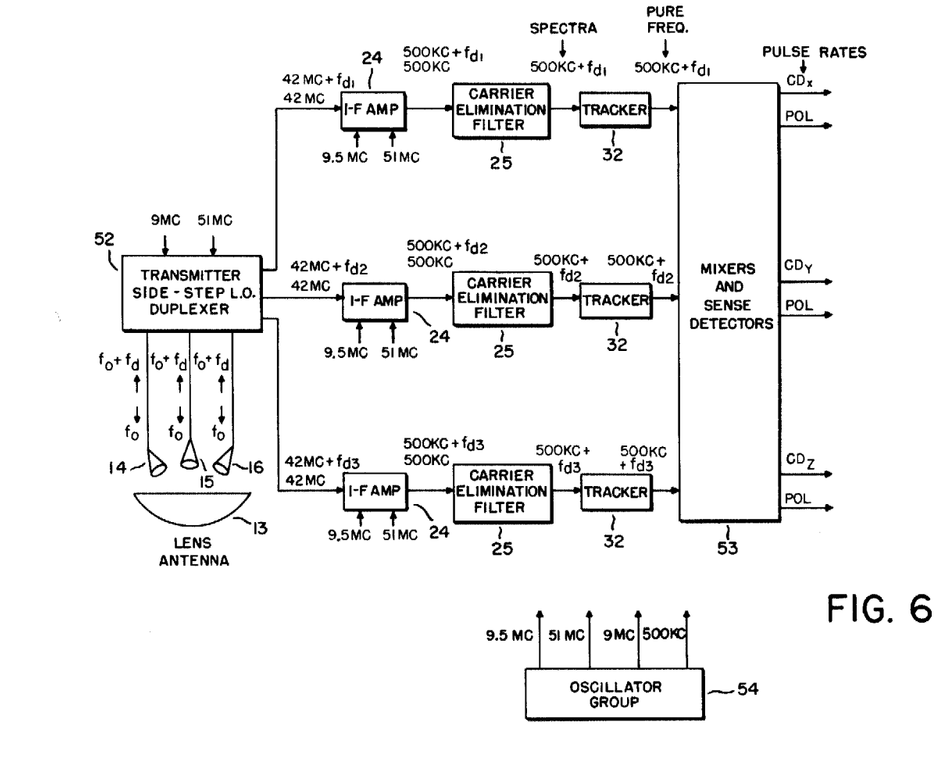
FIG. 6 is a block diagram of a Doppler radar system in a preferred form which tracks the frequency spectra before mixing.

With reference to FIG. 6, there is illustrated a preferred Doppler radar system for deriving the output signals characteristic of the respective generalized Doppler variables, $D_x$, $D_y$ and $D_z$ in which spectrum tracking occurs before mixing. In this arrangement the signal mixing process introduces virtually no noise into the system since the noise rejection characteristic of the trackers has been utilized to provide noise-free single frequency signals for mixing. In addition, the system requires but one external fixed frequency signal after the trackers. Other advantages will become apparent from the following detailed discussion. The reference numerals of FIG. 5 are retained in FIG. 6 to identify corresponding elements.

Microwave lens 13 focuses energy from conical horns 14, 15 and 16 into pencil beam 1, pencil beam 2 and pencil beam 3 respectively of FIG. 1. The energy returned from the respective beams having Doppler frequency shifts $f_{d_1}$, $f_{d_2}$, and $f_{d_3}$, the numbers in the subscripts corresponding to the respective beams, is focused by lens 13 upon the respective horn from which it emanated.

Transmitter side-step local oscillator duplexer 52 is the apparatus represented in blocks 17, 18, 21, 22 and 23 of FIG. 5 and provides the return signals, having Doppler frequency-shifted spectra, translated about an intermediate frequency of 42 mc. The signals with the translated spectra are amplified in respective I.-F. amplifiers 24 and mixed therein in a double conversion system with the 9.5 mc. and 51 mc. fixed frequency signals applied to each I.-F. amplifier, to further translate the respective Doppler frequency-shifted spectra about 500 kc. When transmitter and receiver are simultaneously operative as indicated in the aforesaid co-pending application entitled Radar System, a carrier leakage component will also be translated and amplified. This component is eliminated by each carrier elimination filter to provide the indicated spectra at the inputs of each tracker 32. In response to the input spectra, each tracker provides a single frequency output signal near 500 kc. which is characteristic of the Doppler frequency shift present in the returned energy of the associated beam. The relation of Doppler frequecny shifts to aircraft velocity components is discussed below.

The single frequency signals are non-linearly combined by the mixers and sense detectors 53 to provide output signals in pulse form of a frequency characteristic of the indicated generalized Doppler variables, together with a polarity indication on the corresponding POL line of whether a positive or negative sign is associated with the indicated frequency. The sign is respectively positive or negative when the signal input frequency is respectively above or below the reference input frequency.

Oscillator group 54 provides the indicated coherently generated fixed frequency signals, the advantages of coherent signal generation in a system of the present type being fully discussed in the aforesaid co-pending application entitled Radar System.

Figure 7:
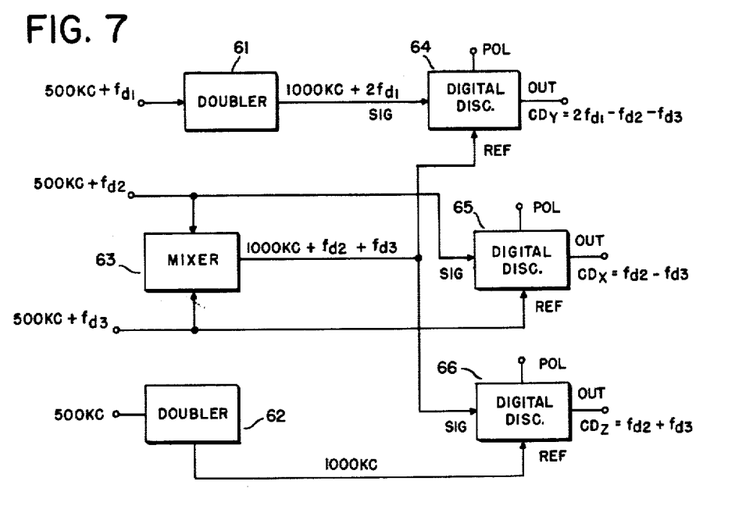
FIG. 7 is a block diagram of the mixers and sense detectors of FIG. 6.

With reference to FIG. 7, the preferred form of mixers and sense detectors 53 is represented in block diagram form. The apparatus comprises a pair of frequency doublers 61 and 62, a mixer 63 and three digital discriminators 64, 65 and 66 which may be of the type disclosed in U.S. Patent No. 2,858,425 of Bernard M. Gordon, entitled Digital Discriminator. Such a discriminator responds to a pair of signals respectively applied to reference and signal inputs with an output pulse train of frequency equal to the frequency difference between said pair of signals, and a polarity output signal to indicate which of the signals is of higher frequency. Other apparatus which provides such signals, in pulse form or otherwise, may be substituted therefor.

The signal of frequency 500 kc.$+f_{d_1}$ is applied to frequency doubler 61 to provide a signal of frequency 1000 kc.$+2f_{d_1}$. The signals of frequency 500 kc.$+f_{d_2}$ and 500 kc.$+f_{d_3}$ are applied to mixer 63 to provide an output signal of sum frequency 1000 kc.$+f_{d_2}+f_{d_3}$. The latter sum frequency signal is applied to the reference input of digital discriminator 64 while the signal input is energized by the signal from doubler 61 of frequency 1000 kc.$+2f_{d_1}$. The reason for doubling and mixing as indicated above now becomes apparent, for the output signal from discriminator 64 is of frequency $2f_{d_1}-f_{d_2}-f_{d_3}$ and is proportional to the desired generalized Doppler variable $D_y$. The sum frequency output signal from mixer 63 is also applied to the signal input of discriminator 66. The reference input thereto is energized with a 1000 kc. signal derived by doubling the frequency of the 500 kc. signal from oscillator group 54 (FIG. 6) in frequency doubler 62. Thus, the output signal of discriminator 66 is a pulse train of frequency equal to $f_{d_2}+f_{d_3}$ and proportional to the desired generalized Doppler variable $D_z$, the associated polarity output signal indicating the sense of this sum frequency.

The final generalized Doppler variable signal is derived by energizing discriminator 65 with the signals of frequency 500 kc.$+f_{d_2}$ and 500 kc.$+f_{d_3}$ on the signal and reference inputs respectively, thereby deriving a signal of frequency $f_{d_2}-f_{d_3}$, proportional to the generalized Doppler variable $D_x$ together with a polarity output signal indicative of the sense of the latter difference frequency.

A better understanding of the significance of these results will follow from relating the generalized Doppler variables to actual movement of the aircraft. For the purposes of this discussion, it is convenient to assume that the helicopter of FIG. 1 is at all times oriented in its normal flight attitude, it being understood that the system is also operable when the aircraft is pitching and/or rolling. If the helicopter is flying at constant altitude forward along a track oriented to coincide with its direction of heading, then there is no Doppler frequency shift in the signal return from pencil beam 1 oriented to the side. At the same time, the energy return from the forward-pointing beam 2 has a positive Doppler frequency shift while that from rearward oriented beam 3 has a negative Doppler shift of the same magnitude. Positive and negative Doppler frequency shifts correspond to returned spectra respectively above and below the frequency of the radiated energy. Thus, $f_{d_1}=0$, and $f_{d_2}=-f_{d_3}$. Then $D_y$ is proportional to $2.0-f_{d_2}-(-f_{d_2})=0$, correctly indicating that there is no sidewise velocity component. $D_z$ is proportional to $f_{d_2}+(f_{d_2})=0$, correctly indicating that the climb velocity component is zero. $D_x$ is proportional to $$f_{d_2}-(-f_{d_2})=2f_{d_2}$$

correctly indicating a forward velocity. If the helicopter were instead traveling rearward, the variables $D_y$ and $D_z$ would remain zero while the sense of the frequency shift in the return from beams 2 and 3 would reverse so that $D_x$ would then be proportional to $$-f_{d_2}-(+f_{d_2})=-2f_{d_2}$$

correctly indicating a rearward velocity.

In actual flight, the aircraft heading and the direction of its actual track along the earth do not coincide because the aircraft heading compensates for sidewise components of wind velocity. In such cases, the component of velocity orthogonal to the direction of heading, is indicated by a corresponding Doppler frequency shift in the energy returned from beam 1, thereby yielding a non-zero value for $D_y$ of a polarity which indicates whether the drift velocity is to the left or right.

To consider a case where climb velocity is indicated, it is convenient to assume the normally oriented helicopter climbing with all horizontal velocity components equal to zero. Then, the energy return from each of the beams indicates a negative Dopper frequency shift of the same amount, and $D_y$ is proportional to $$-2f_{d_2}-(-f_{d_2})-(-f_{d_2})=0$$

$D_x$ is proportional to $-f_{d_2}-(-f_{d_2})=0$, and $D_z$ is proportional to $-[(-f_{d_2})+(-f_{d_2})]=2f_{d_2}$, correctly indicating an upward vertical velocity. If the helicopter were instead descending with zero horizontal velocity, the Doppler frequency shifts would be positive and $D_z$ would then be proportional to $-2f_{d_2}$, correctly indicating downward vertical velocity.

The novel apparatus of FIG. 7 non-linearly combines the single frequency signals derived from the trackers 32 to provide an unambiguous precise indication of the magnitude and direction of aircraft movement in space while employing relatively lightweight components in circuits which provides output signals indicative of the desired quantities in terms of events or pulses per unit time. Characterizing the quantities in this manner yields output information whose accuracy is unimpaired despite variations in supply voltages and individual circuit parameters. Output signals in pulse form are especially suitable for application to an operational digital computer which is fully described in the references cited in the parent application entitled Doppler Radar System.

Figure 8:
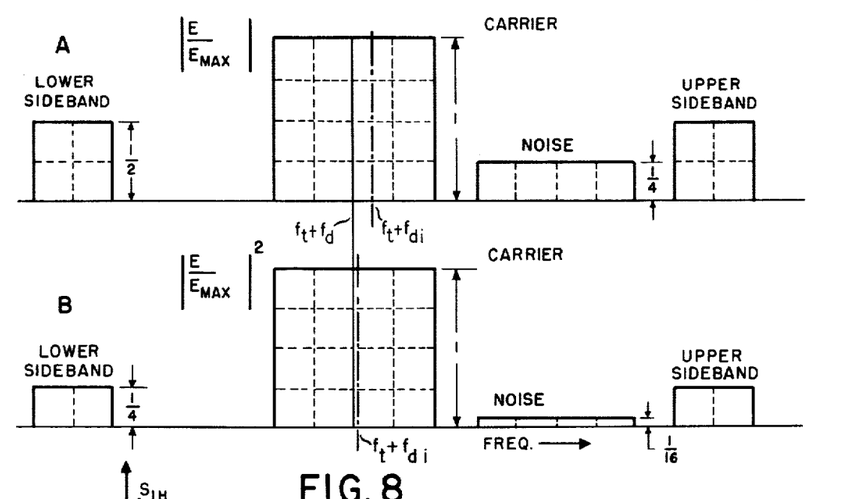
FIG. 8 is a graphical representation of signal and noise spectra to illustrate the principles of spectrum tracking.

Referring to FIG. 8, the principles of spectrum tracking will now be discussed. To facilitate an understanding of methods which may be utilized for spectrum tracking, the frequency spectra of FIG. 8 are graphically represented as rectangular, it being understood that in practice, the spectra more nearly resemble those illustrated in FIG. 4. However, the principles discussed in connection with FIG. 8 are equally applicable to spectra of any shape. The broken lines divide the spectra into squares to facilitate graphical integration.

Referring to FIG. 8A, there is illustrated Doppler frequency shifted spectra plus a noise spectrum present in the received energy. The spectra are represented with carrier and first upper and lower sidebands symmetrically disposed about the vertical axis which coincides with the frequency $f_t+f_d$ where $f_t$ is the nominal frequency about which tracking occurs and $f_d$ is the Doppler frequency shift which is accurately indicative of relative velocity along the associated transmitted beam. In the apparatus of FIG. 6, the frequency $f_t$ is 500 kc. The spectra amplitude are represented on a normalized basis as $$\frac{E}{E_{max}}$$

where E represents the voltage amplitude of a spectrum and $E_{max}$, the maximum voltage amplitude of the largest spectral component. In this illustrative example, the largest spectral components are in the returned carrier spectrum and are accordingly represented as of unity normalized amplitude. The normalized amplitude of the first upper and lower sidebands is ½ and that of the noise spectrum ¼.

A desirable method of tracking includes the steps of dividing the band encompassing the voltage spectra into regions about a frequency such that the area of spectra below this frequency equals the area of spectra above the frequency, and provide a signal of the frequency as an output. If the noise spectrum were absent, the selected frequency would coincide with the frequency $f_t+f_d$. However, with the noise spectrum present as indicated disposed between the carrier spectrum and upper sideband spectrum, the frequency indicated becomes displaced upward to $f_t+f_{d1}$, where $f_{d1}$ represents the indicated Doppler frequency shift in the presence of noise. The area of voltage spectra respectively below and above the indicated frequency is seen to be 14 squares. It is desirable to maintain the frequency difference $f_{d1}-f_d$ as small as possible in order to provide an accurate velocity indication.

A marked reduction of this difference is obtained by tracking according to the preferred method of the invention. Instead of dividing the voltage spectrum into equal areas, the power spectrum is so divided. This improvement will become apparent from the following example which is illustrated in FIG. 8B, where the normalized voltage spectrum of FIG. 8A is squared to yield the normalized power spectrum. It is seen that the squaring process effects a greater reduction in lower amplitude components than higher amplitude components. Thus, the carrier spectrum normalized amplitude remains unity, the sideband spectra amplitudes are reduced to ¼; and the noise spectrum amplitude, to ¹⁄₁₆. Hence, while the area of the carrier amplitude spectrum is unchanged and the area of the sideband spectra is reduced by only ½, the noise spectrum area is reduced by ¼. The frequency $f_t+f_{d1}$ is thus now seen to be disposed so that spectra area on either side is 10½ squares. Note that the frequency difference $f_{d1}-f_d$ has been reduced by a factor of four, thereby effecting a marked reduction in the deviation of the indicated Doppler frequency shift $f_{d1}$ from the desired value $f_d$.

It should be observed that tracking at relatively high frequencies enables lower and upper sidebands to retain their relative position about the carrier. Thus, spectrum foldover and its accompanying problems are completely absent from the present system. Furthermore, the energy in the sidebands may be sensed to derive tracking information, enhancing the noise rejection characteristics of the system. Yet, the apparatus is still capable of functioning as a low frequency tracker should it be desired, merely by arranging the oscillator to be capable of emitting audio frequency signals.

Utilization of the returned sideband energy is especially desirable when the signal spectrum is initially sensed to determine the proper frequency at which to track. The tracking apparatus of the present invention is effective in providing a D.-C. control signal which tends to maintain the frequency of an oscillator at $f_t+f_{d1}$. Spectral components above and below this frequency contribute respectively positive and negative voltage components to the control signal. When the spectral areas below and above the oscillator frequency are equal, the control signal is substantially zero.

Initially, the spectral components are unsymmetrically disposed relative to the oscillator frequency. For example, consider a situation in which the oscillator frequency is initially above the upper sideband of FIG. 8A, and the amplitude of the control signal is proportional to the area of the spectral components. If the sidebands are discarded, the area below the oscillator signal contributing to the control signal is but 20 squares of which 4 squares is noise area. Practically, there is as much noise area below the oscillator frequency as above; therefore, the contribution of noise below oscillator frequency may be disregarded. The net area tending to contribute to the control signal is then the 16 squares of the carrier spectrum. But if the sideband spectra are also sensed, the net area then becomes 24 squares. The control signal is accordingly increased, and a more rapid change of the oscillator frequency to $f_t+f_{d1}$ is thereby effected.

As a practical matter, there is a limit to the number of sidebands it is desirable to retain. If the area of a sideband spectrum is less than the area of noise spectra between it and the next lower order sideband spectrum, then better noise rejection will result if the apparatus is arranged to respond only to a band of frequencies whose extremities substantially coincide with the said next lower order sideband spectra. Since the preferred system utilizes a 50 percent duty cycle as described in the co-pending application of Maurice A. Meyer, entitled Radar System, most of the returned energy is in the lower order sidebands. Hence, the tracking apparatus may be made sensitive to a limited frequency band encompassing nearly all the desired signal return energy. Once the oscillator attains the frequency $f_t+f_{d1}$, the tracking apparatus may be narrow banded to respond to only a portion of the carrier spectrum, thereby virtually eliminating response to noise spectra. The oscillator frequency will then be precisely the desired $f_t+f_d$.

Figure 9:
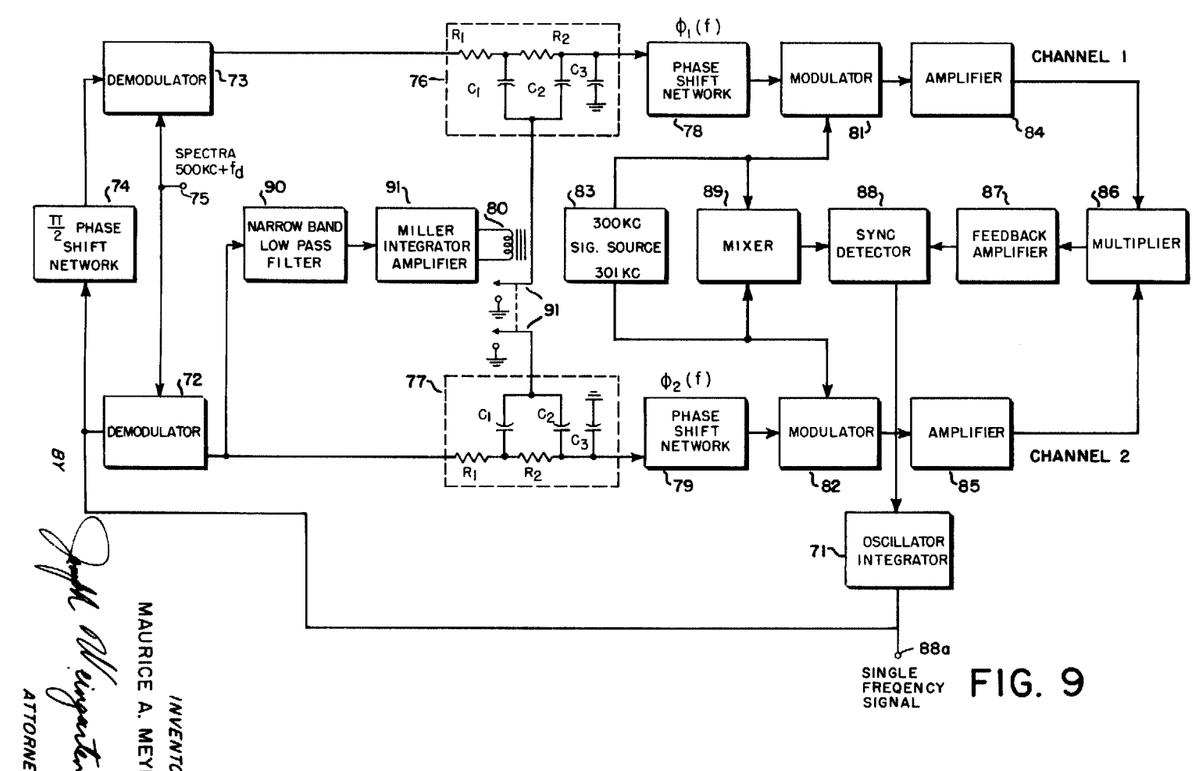
FIG. 9 is a block diagram of apparatus which tracks the spectrum of an input signal.

Referring now to FIG. 9, there is illustrated a block diagram of apparatus generally of the type fully described in the co-pending application of Maurice A. Meyer, entitled Frequency and Phase Sensitive Apparatus, Serial No. 464,697, filed October 26, 1954. Since the mode of operation and specific example is there described in detail, the scope of the present discussion will be limited to the mode of operation whereby tracking of the power and voltage spectrum in the manner described above is obtained.

The tracker is arranged with a frequency-controlled oscillator integrator 71 energizing demodulators 72 and 73 respectively directly and through $$\frac{\pi}{2}$$

phase shift network 74. The latter demodulators are also energized at terminal 75 by the signal from a respective carrier elimination filter 25, the signal having Doppler frequency-shifted spectra, to translate the spectral components about the oscillator frequency to corresponding positions about zero frequency in channels 1 and 2. The translated spectral components are applied to low pass filters 76 and 77 respectively which comprise resistors $R_1$ and $R_2$ and capacitors $C_1$, $C_2$ and $C_3$, the former two capacitors being out of the circuit except when relay 80 connects them to ground.

The output signals from the respective low pass filters are applied to phase-shift networks 78 and 79 respectively, having phase shift characteristics as a function of frequency of $\phi_1(f)$ and $\phi_2(f)$ respectively. The phase-shifted signals are applied to modulators 81 and 82 respectively for translation about the 300 kc. and 301 kc. signals respectively supplied from signal source 83. The translated signals are amplified by amplifiers 84 and 85 and multiplied together in multiplier 86, which may be a balanced modulator, to derive a one kilocycle product difference frequency signal which is selectively passed by feedback filter amplifier 87 to synchronous detector 88, which may also be a balanced modulator.

The other input of synchronous detector 88 is energized by a one kilocycle difference frequency signal derived by mixing the 300 kc. and 301 kc. signals from signal source 83 in mixer 89. The output of synchronous detector 88 is a D.-C. control signal which is applied to oscillator-integrator 71 and maintains the oscillator frequency at 500 kc.$+f_{d1}$.

The output of demodulator 72 is applied to the narrow band low pass filter 90 which energizes the Miller integrator amplifier 91. The output signal of the latter controls relay 80 which in turn controls the bandwidth of low pass filters, for with relay arms 91 connected to ground, capacitors $C_1$ and $C_2$ are effective in attenuating higher frequency signals.

Figure 10:
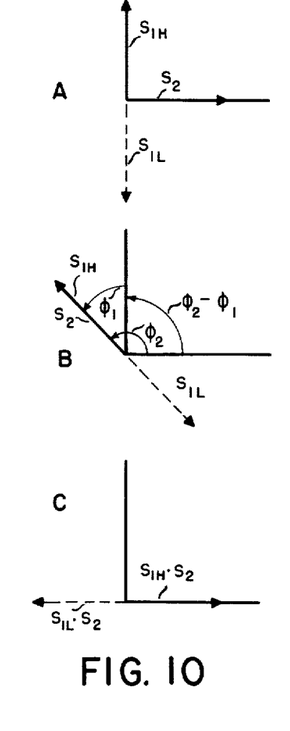
FIG. 10 is a vector diagram helpful in understanding the mode of operation of the apparatus of FIG. 9 when tracking an input signal spectrum.

The vector diagrams of FIG. 10 will facilitate understanding how the apparatus tracks on the mean frequency of the power or voltage spectrum, that is, the frequency which divides the band encompassing the returned carrier power or voltage spectrum and a selected number of sideband power or voltage spectra into two bands, each having equal spectral area. Since each spectral component in the power spectrum represents energy per unit cycle, the effective power spectrum integration performed with respect to frequency results in the mean frequency dividing the band into a pair of equal energy bands.

In FIG. 10 the vectors $S_1$ designate voltage vectors of a particular spectral component in channel 1 at the output indicated relative to the same spectral component designated $S_2$ at a corresponding output in channel 2. The subscripts L and H associated with the $S_1$ vectors designate particular spectral components of frequency respectively lower and higher than the frequency 500 kc.$+f_{d1}$ of the oscillator signal.

The effect of demodulating the input signal spectra by mixture with respective quadrature components of the oscillator signal is that at the output of low pass filters 76 and 77, there appears signal components in phase quadrature for each spectral frequency. For a particular spectral component of frequency $f_s$, the corresponding component at the output of low pass filters 76 and 77 is $f_s-500$ kc.$-f_{d1}$ and may be conveniently designated $\Delta p$. The outputs from low pass filters 76 and 77 for each spectral component will then be $E \sin 2\pi\Delta p$ and $E \cos 2\pi\Delta p$ respectively, $\Delta p$ being respectively positive and negative for spectral components higher and lower than the oscillator frequency. Since $\cos x = \cos(-x)$, the cosine signal polarity is the same for spectral components above and below the oscillator frequency. However, $\sin x = -\sin(-x)$ and an abrupt polarity reversal occurs in the sine signal in channel 1 for spectral components immediately above and below the oscillator frequency. Accordingly, a spectral component in channel 2 may be represented at the output of low pass filter 77 by the vector $S_2$ of FIG. 10A for both positive and negative values of $\Delta p$. Spectral components above the oscillator frequency in channel 1 are represented at the output of low pass filter 76 by the vector $S_{1H}$ of FIG. 10A, while components below oscillator frequency are represented by the broken-lined vector $S_{1L}$. The vectors may be considered to rotate in a clockwise direction at angular frequency $2\pi\Delta p$ with their projections along the horizontal or real axis as a function of time being characteristic of the associated time function.

Phase shift networks 78 and 79 are arranged so that over the frequency band equal to the bandwidth encompassing the desired spectra, the difference in phase shift imparted by networks 78 and 79 is substantially 90° with the latter network imparting the larger phase shift. Thus, at the output of the phase shift networks, the relative phase of vectors $S_{1H}$ and $S_2$ is substantially zero and vectors $S_2$ and $S_{1L}$, though collinear, are 180° out of phase. These relative phases are preserved in the modulation and amplification processes which follow. (FIG. 10B.)

The result of multiplying together the channel 1 and 2 signals in modulator multiplier 86 may be represented by the non-rotating product vectors designated $S_{1H} \cdot S_2$ and $S_{1L} \cdot S_2$ which may respectively represent $S^2 \sin^2 2\pi \Delta p t$ and $-S^2 \sin^2 2\pi \Delta p t$. Each of these signals as a D.-C. component which is sensed by synchronous detector 88 to derive a signal for application to oscillator-integrator 71. The integrator portion combines the D.-C. component from each spectral component to derive a resultant control signal which adjust the oscillator frequency in a direction tending to maintain the sum of positive components derived from spectral components above the oscillator frequency equal to the sum of negative components below.

In a form for sensing the power spectrum, the apparatus is arranged so that there is no amplitude limiting of the spectral components and the gain through channels 1 and 2 is substantially the same. As a result, the magnitude of each S vector is proportional to the voltage amplitude E of its associated spectral component and the D.-C. derived from each spectral component is proportional to $E^2$ which in turn is proportional to the power spectrum of the input signal. Since the control signal is derived in response to the D.-C. components proportional to $E^2$, the desired power spectrum tracking of the type described in connection with FIG. 8B is obtained. The single frequency signal upon terminal 88a is then applied to the mixers and sense detectors 53 of FIG. 6.

If it is desired to track on the voltage spectrum of the input signal, amplifier 85 may be arranged to provide a gain sufficiently high so that the signal from channel 2 is amplitude limited by multiplier 86. Then the amplitude of the vectors $S_2$ are substantially constant and the amplitude of the vectors $S_1$, proportional to voltage, determine the oscillator frequency. Hence, tracking is then on the voltage spectrum. If the gain of amplifier 85 is arranged so that limiting of the $S_2$ vectors occurs only when related spectral components are large, then there results a combination of voltage and power spectrum tracking whereby the contribution of small amplitude spectral components to a determination of the control signal is on a power basis; of large amplitude components, on a voltage basis.

The apparatus is capable of tracking signals in the presence of noise, resulting in a reliable tracking despite noise to signal ratios as high as 20 db. In other words, the amplitude of noise may be 10 times that of the signal, yet the latter is accurately tracked.

The preferred form of feedback filter amplifier 87 includes a feedback loop with a twin-T network therein. As is well-known in the art, the transfer function of a twin-T network has poles and zeros arranged in the complex frequency plane to effect a frequency response characteristic which exhibits a sharp null at a selected frequency. By inserting such a network in a feedback loop, the transfer function of the overall amplifier has poles and zeros located respectively where the zeros and poles of the twin-T transfer function were. Consequently, the feedback filter amplifier 87 has a frequency response characteristic which exhibits a sharp peak at the selected frequency, which in this example is selected as one kilocycle. A twin-T transfer function which characterizes networks having the desired response appears in an article by Yosiro Oono entitled, "Design of Parallel-T Resistance-Capacitance Networks," on page 617 of Proceedings of the IRE for May 1955.

Tracking accuracy in further enhanced by the provision of means for narrow banding when the center of the returned carrier power spectrum substantially coincides with the frequency of the oscillator output signal. This feature is instrumented by the cooperative arrangement which includes low pass filter 90, Miller integrator amplifier 91, relay 80 and low pass filters 76 and 77.

Narrow band low pass filter 90 is energized by the output signal from demodulator 72. The bandwidth of low pass filter 90 is preferably about equal to the widest spectrum returned. Its output signal thus contains only those spectral components of the signal applied to terminal 75 which are immediately adjacent the contemporary value of the oscillator frequency. The output signal from low pass filter 90 is applied to Miller integrator amplifier 91. When the oscillator frequency approaches the center of the returned carrier spectrum, there is an increase in the amplitude of the signal output from filter 90 to which amplifier 91 responds by energizing relay 80, moving arms 91 to the position which grounds capacitors $C_1$ and $C_2$ in low pass filters 76 and 77.

With capacitors $C_1$ and $C_2$ ungrounded, serially connected resistors $R_1$ and $R_2$ form with capacitor $C_3$ a single L-section low pass filter having a bandwidth greater than that of the returned carrier spectrum. When capacitors $C_1$ and $C_2$ are grounded, resistor $R_1$ with capacitor $C_1$ and resistor $R_2$ with the parallel combination of capacitors $C_2$ and $C_3$ form a double L-section low pass filter of bandwidth which encompasses only a fraction of that of the returned carrier spectrum. With the apparatus narrow banded, the noise energy outside the spectral region immediately adjacent the oscillator frequency is rejected, enhancing reliable accurate tracking of the desired returned carrier spectrum.

A feature of the present narrow banding arrangement is the provision of means for precluding tracking a sideband spectrum. A sideband spectrum may be ordinarily of sufficiently large amplitude to effect energization of relay 80 whence the tracker would narrow band on the sideband and yield an erroneous indication of the Doppler frequency shift. To avoid this, Miller integration amplifier 91 is arranged to have a delayed response. The extent of the delay introduced depends on the minimum rate at which the oscillator frequency moves toward the center of the returned carrier spectrum. A typical delay found to be satisfactory in practice is three seconds. Thus, although the amplitude of a sideband spectrum is relatively large, it is sensed by the narrow banding apparatus for a time interval too short to actuate relay 80. However, when the oscillator frequency is near the center of the returned carrier spectrum, the control signal is substantially zero, the change in oscillator frequency is slight and the spectral components of large amplitude are sensed for a sufficient duration to actuate relay 80.

To prevent the apparatus from switching back and forth between narrow and wideband operation during intermittent fades of the returned signal, the effective discharge time constant of the Miller integrator amplifier is made relatively large. In practice, this time constant is chosen so that relay 80 remains closed for a period of 11 seconds after a loss of signal.

The accuracy with which tracking may be obtained from the above apparatus will be better appreciated from a consideration of the results of an actual flight test. In a test of the system of FIG. 5 installed in a helicopter, on a flight of approximately 110 miles, the actual distance indicated by course counter 37 was in error only by 0.114 percent.

The specific apparatus and frequencies disclosed herein are by way of example only. Numerous modifications of and departures from these specific examples may be practiced by those skilled in the art without departing from the inventive concepts. Consequently, the invention is to be construed as limited only by the spirit and scope of the appended claims.

What is claimed is:

1. In an airborne Doppler radar system, apparatus for deriving signals characteristic of aircraft velocity comprising, means for radiating downward a plurality of beams of high frequency energy angularly disposed about the normally vertical axis of the aircraft, means for separately receiving the energy returned from each beam having Doppler frequency-shifted spectra, means for deriving respective beam signals for each beam characteristic of the Doppler frequency shift of the returned energy therefrom, and signal combining non-linear means responsive to said beam signals for deriving three output signals respectively characteristic of aircraft velocity components along three mutually perpendicular axes of the aircraft, one of which is said normally vertical axis.

2. Spectrum tracking apparatus comprising, a variable frequency signal source, means for mixing quadrature components of said variable frequency signal with an input signal having a plurality of spectral components to derive first and second difference frequency signals, first and second low pass filters respectively energized by said first and second difference frequency signals, the response of said filters being selectable for wide or narrow band operation, means for respectively coupling the output signals from said first and second low pass filters to first and second phase shift means having predetermined dissimilar phase-shift characteristics as a function of frequency to derive first and second phase shifted signals, means for multiplying together signals related to said first and second phase shifted signals to derive a product signal having a direct current component characteristic of the relative area of spectral components above and below said variable frequency which are passed by said low pass filters after translation, means responsive to said direct current component for controlling the frequency of said variable frequency source to cause the variable frequency to move toward a frequency which divides the spectrum of said input signal into substantially equal areas, a narrow band low-pass filter energized by said second difference frequency signal, and a Miller integrator energized by said narrow band low-pass filter said Miller integrator responding to spectral components having an area above a selected level for greater than a predetermined length of time by providing a selecting signal which is effective in selecting narrow band operation for said first and second low pass filters, said integrator responding to the area dropping below said selected level longer than a predetermined duration of time by providing a second selecting signal which is effective in selecting wide band operation for said first and second low pass filters.

3. The apparatus of claim 2 wherein the difference in phase-shift imparted by said first and second phase shift means is substantially ninety degrees.

4. Signal tracking apparatus to track, in the presence of noise, the carrier frequency of a complex electric signal which is made up of a spectrum of sidebands grouped around such carrier frequency, comprising:
   (a) an electric signal generator producing a tracking signal having a single frequency;
   (b) means for comparing the power in the portion of the complex electric signal and the accompanying noise which have frequencies higher than the tracking signal frequency with the power in the portions of the complex electric signal and the noise which have frequencies lower than the tracking signal to produce a control signal in accordance with the difference between such powers; and
   (c) means for applying such control signal to the electric signal generator to change the frequency of the tracking signal to cause the tracking signal to divide the power in the complex signal and the noise above and below the tracking signal frequency into two substantially equal parts.

5. Signal tracking apparatus as in claim 4 wherein the first named means includes band-pass means arranged to pass a band of frequencies encompassing those portions of the complex electric signal being tracked which have amplitudes equal to, or greater than, the amplitude of the accompanying noise.

6. Signal tracking apparatus as in claim 5 wherein the pass band of the band-pass means is adjustable in accordance with the magnitude of the control signal so that, when the tracking signal frequency and the carrier frequency of the complex electric signal substantially coincide, only portions of the complex electric signal having frequencies adjacent to the carrier frequency are effective in producing the control signal and substantially all the noise within the frequency band encompassed by the spectrum of the complex electric signal is excluded.

7. In a Doppler radar system of the type having means for radiating a high frequency signal and means for receiving reflections of the radiated signal, the received signals having a Doppler-shifted spectrum of frequencies accompanied by noise, the improvement of signal tracking apparatus comprising:
   (a) a frequency controllable oscillator for generating a tracking signal;
   (b) means for combining the tracking signal and the received signals to convert the Doppler-shifted spectrum and its accompanying noise to a lower frequency range;
   (c) means for comparing the power of the converted signals whose frequencies are higher than the tracking signal frequency with the power of the converted signals whose frequencies are lower than the tracking signal to produce a control signal in accordance with the difference between such powers; and
   (d) means for applying the control signal to the controllable oscillator to cause the frequency of the tracking signal to change in the direction tending to equalize the power in the converted signals above and below the tracking signal's frequency.

References Cited in the file of this patent

UNITED STATES PATENTS

| | | |
|---|---|---|
| 2,455,639 | Anderson | Dec. 7, 1948 |
| 2,688,743 | Berger | Sept. 7, 1954 |
| 2,821,702 | Russell | Jan. 28, 1958 |
| 2,857,590 | Berger | Oct. 21, 1958 |
| 2,871,468 | Smith | Jan. 27, 1959 |
| 2,891,245 | Coogan | June 16, 1959 |
| 2,896,074 | Newsom | July 21, 1959 |

UNITED STATES PATENT OFFICE
CERTIFICATE OF CORRECTION

Patent No. 3,088,109

April 30, 1963

Maurice A. Meyer

It is hereby certified that error appears in the above numbered patent requiring correction and that the said Letters Patent should read as corrected below.

Column 6, line 8, for "system" read -- systems --; column 7, line 32, after "and" insert -- are --; column 9, line 32, for "$f_{d2}+(f_{d2})$" read -- $f_{d2}+(-f_{d2})$ --; line 73, for "provides" read -- provide --; column 13, line 33, for "as" read -- has --; column 13, line 38, for "adjust" read -- adjusts --; column 14, line 19, for "Neworks" read -- Networks --; line 21, for "in" read -- is --.

Signed and sealed this 26th day of November 1963.

(SEAL)
Attest:

ERNEST W. SWIDER

EDWIN L. REYNOLDS

Attesting Officer

Acting Commissioner of Patents